United States Patent Office 2,905,449
Patented Sept. 22, 1959

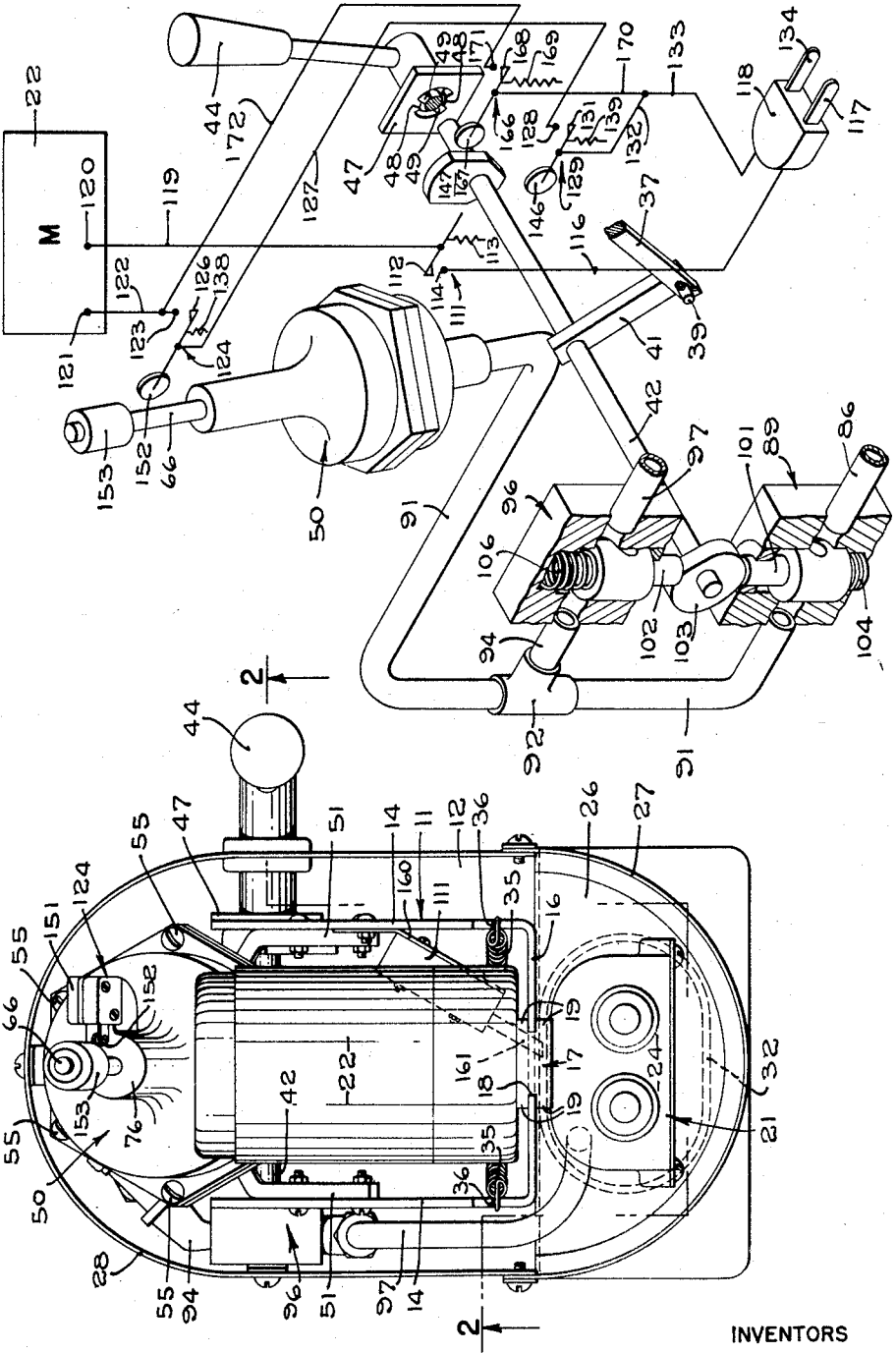
Sept. 22, 1959     W. C. BELK ET AL     2,905,449
CONCENTRATED BEVERAGE RECONSTITUTOR
Filed Oct. 28, 1953     3 Sheets-Sheet 1
INVENTORS
WILBER C. BELK
ELMER F. FROST, JR.
BY *Hans G. Hoffmeister*
ATTORNEY

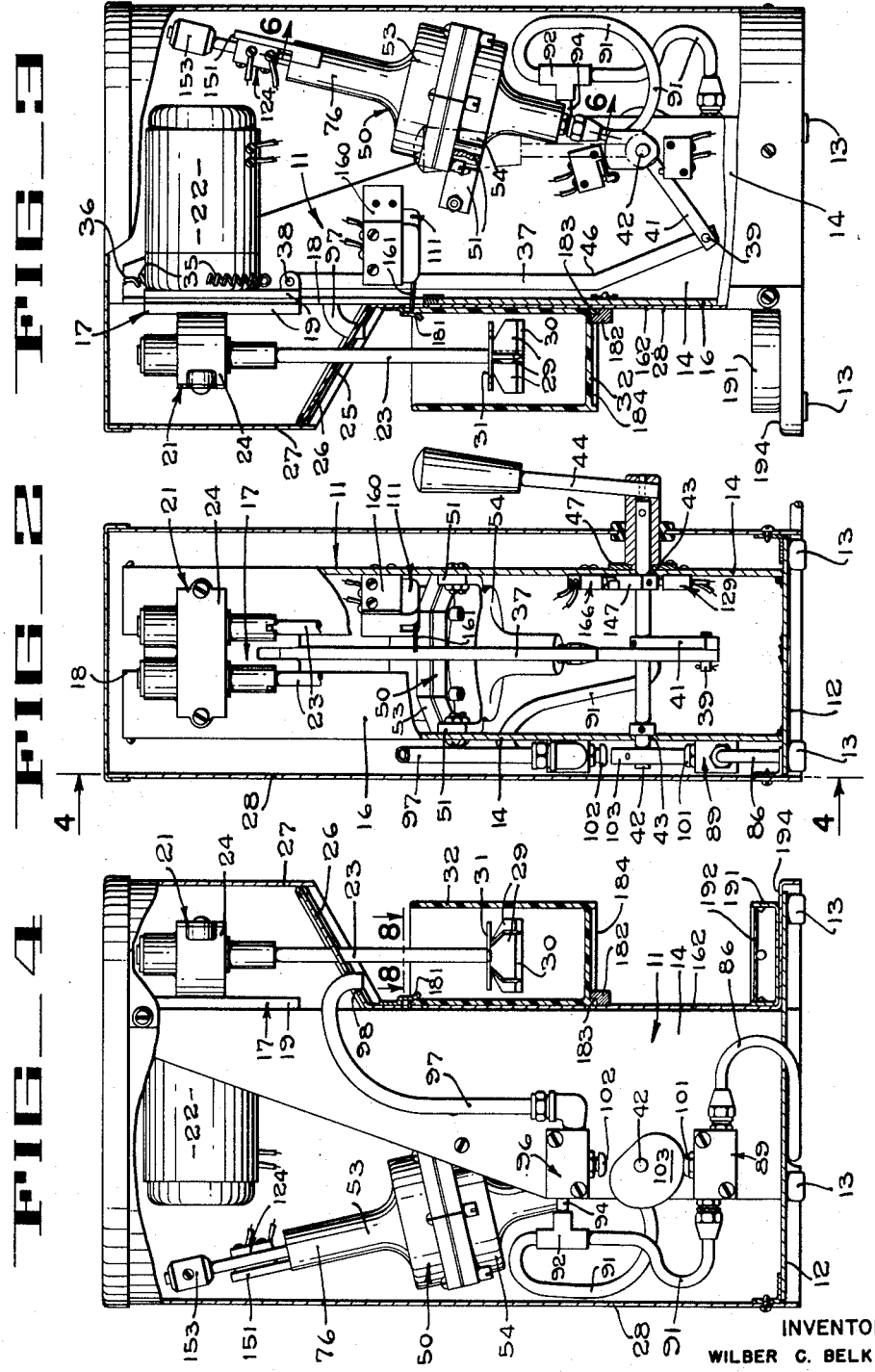

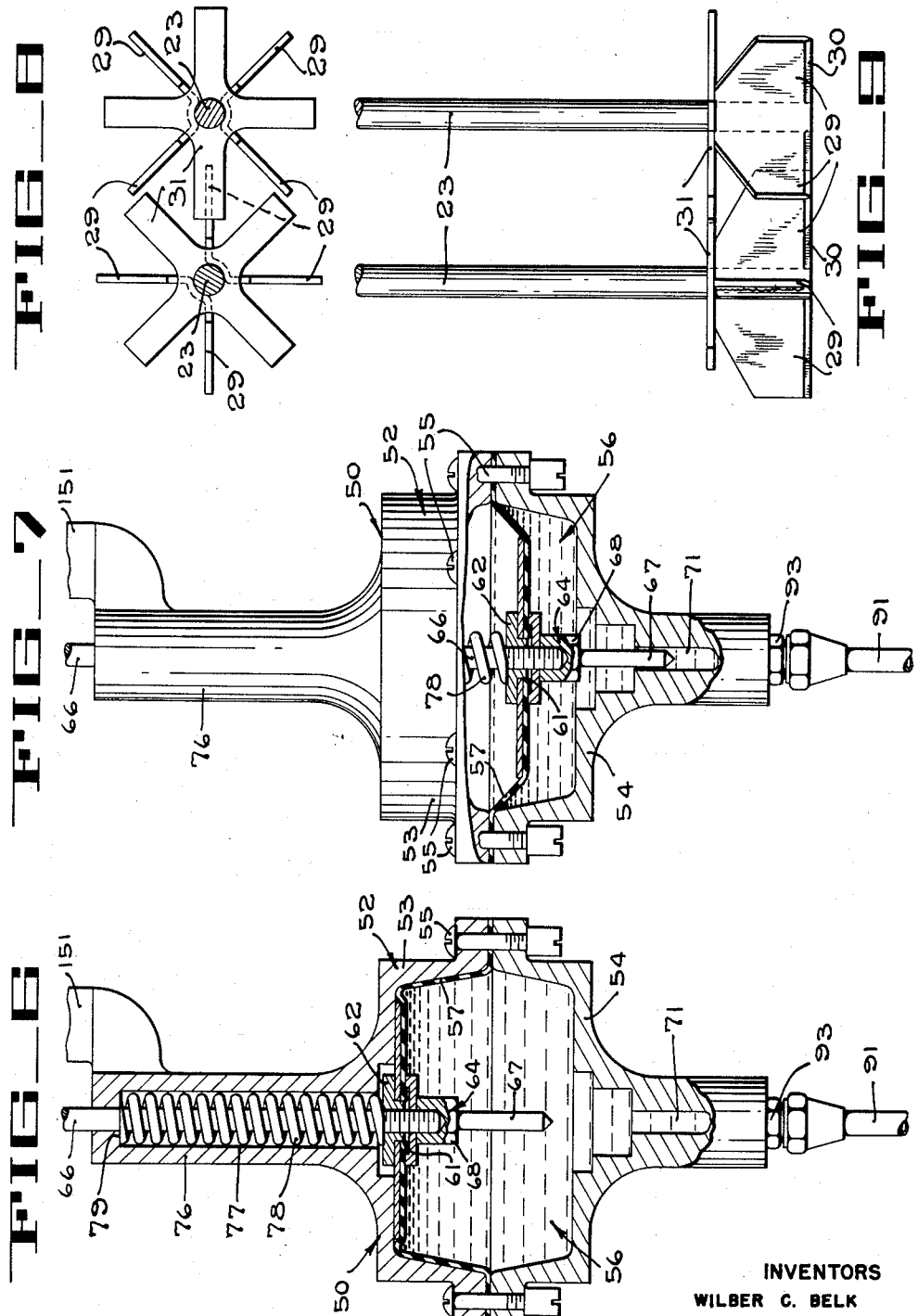

2,905,449

CONCENTRATED BEVERAGE RECONSTITUTOR

Wilber C. Belk and Elmer F. Frost, Jr., Lakeland, Fla., assignors to Food Machinery and Chemical Corporation, San Jose, Calif., a corporation of Delaware Application October 28, 1953, Serial No. 388,794

12 Claims. (Cl. 259—24)

This invention relates to mixing apparatus, and more particularly to apparatus for reconstituting concentrated material by mixing diluent therewith.

An object of the invention is to provide an improved beverage mixer.

Another object of the invention is to provide a device for mixing diluent with concentrated material such as concentrated citrus juice to reconstitute the same to its original composition.

Another object is to provide a machine for making a beverage from a frozen concentrate.

Another object is to provide a machine for making a beverage by adding diluent to a frozen concentrate and agitating the ingredients to mix them together.

Another object is to provide a beverage mixer including means for automatically measuring the quantity of diluent necessary to dilute a standardized charge of concentrate to a desired consistency.

Another object is to provide apparatus for agitating or beating the concentrate and diluent, and control apparatus for automatically discontinuing the agitation after a predetermined mixing period.

Another object is to provide means for activating the beater of a beverage mixer for a brief interval after the beater has been withdrawn from the mixed beverage but while it is still within the confines of the mixing receptacle, so as to effect removal of particles or drops of the mixed substance which otherwise might drip from the beater after the receptacle has been removed.

Another object is to provide a beverage mixer including a motor driven beater movable from a raised position to a lowered position within a mixing receptacle, and operative as the beater is lowered to initiate automatically and in properly timed sequence all of the operative functions of dispensing the measured quantity of diluent into the mixing receptacle, starting the beater motor, stopping the motor at the end of a properly timed beating period, cleaning the beater structure, and refilling the diluent dispenser with the proper quantity of liquid to place the apparatus in readiness for a subsequent cycle of operation.

Another object is to provide an improved form of beater for a beverage mixer.

Another object is to provide a concentrated beverage diluting and mixing machine particularly adapted for use in restaurants, juice bars, and other commercial establishments frequently required to make individual servings of fruit or vegetable juice.

Another object of the invention is to provide a beverage mixer that is always ready for instant use and which prepares uniform servings of beverage.

The invention possesses other objects and valuable features which will become apparent from the following description and the drawings, in which:

Fig. 1 is a top plan of the beverage reconstitutor of the present invention, with the cover of the apparatus removed.

Fig. 2 is a transverse vertical section taken on line 2—2 of Fig. 1.

Fig. 3 is a side elevation viewed from the right in Fig. 2, portions of the housing, supporting frame and mixing receptacle being broken away.

Fig. 4 is a vertical section taken on line 4—4 of Fig. 2.

Fig. 5 is a partially schematic perspective of the tubing connections and the electrical circuits of the reconstitutor.

Fig. 6 is a sectional view of the diluent accumulator, taken on line 6—6 of Fig. 3, showing the accumulator filled to capacity.

Fig. 7 is an elevation of the accumulator, parts being broken away to show the interior of the accumulator with its contents partially discharged.

Fig. 8 is a detail view of the beaters, taken on line 8—8 of Fig. 4.

Fig. 9 is an elevation of the beaters of Fig. 8.

The beverage reconstituting machine of the present invention includes a frame 11 having a base plate 12 supported on feet 13 of suitable friction material and carrying two upstanding side plates 14 welded at their lower ends to the base 12. The plates 14 are maintained rigidly in spaced, parallel relation by a transverse front plate 16.

A plate 17 is mounted for vertical reciprocatory movement in a vertical slot 18 in the front plate 16 by two pairs of spaced flanges 19 (Fig. 1), one on each side edge of the plate 17. The flanges 19 of each pair slidably embrace one of the lateral edges of the slot 18. The plate 17 provides a vertically movable support for a beater assembly 21 which includes an electric motor 22 and a pair of beater shafts 23 adapted to be rotated in opposite directions by the motor 22 through suitable gears (not shown) within a gear housing 24.

The shafts 23 project downward through openings 25 (Fig. 3) in the bottom wall 26 of an overhanging portion 27 of the housing 28 of the apparatus and carry beater blades 29 radiating from their lower ends. The parts are so proportioned and arranged that the shafts 23 are separated by a distance only slightly greater than the radial length of each of the blades 29, and, as shown in Figs. 8 and 9, the blades 29 of the two shafts 23 are arranged in interdigitating relation. The lower edge 30 of each of the blades 29 is relatively sharp so as to facilitate cutting a charge of frozen concentrated citrus juice into smaller pieces as the beaters are lowered to their operative position. Each of the beater shafts 23 also is provided with horizontal plates 31 extending radially therefrom at a higher location than the beater blades 29 and above the spaces between adjacent beater blades. The function of the horizontal plates 31 is to intercept drops and small particles of beverage that would otherwise be splashed out of the mixing receptacle 32 within which the beaters operate, thus permitting operating the beater at such a speed that the blades 29 not only throughly break up the frozen charge and effect through mixing thereof with the diluent but they also aerate the resultant liquid and thereby improve its flavor.

The beater assembly 21 is yieldably supported in its upper, idle position by a spring 35 whose ends are engaged in notches 36 in the upper edges of the frame plates 14, thus forming a bight within which the motor 22 is cradled. The means for lowering the beater assembly comprises a link 37 connected by a pivot pin 38 at its upper end to the supporting plate 17 of the beater assembly and connected at its lower end by a pin 39 to a crank arm 41 rigid with and extending radially from a transversely extending shaft 42. The shaft 42 is journalled in axially aligned bearings 43 (Fig. 2) in the two plates 14 of the frame 11 and carries a handle 44 outside the housing. The parts are so arranged that when the handle 44 is rotated forward and downward through approximately 90°, the crank 41 draws the link 37 downward, lowering the beater assembly 21 until its blades 29 are disposed in their operative position adjacent the bottom of the mixing receptacle 32 suitably located on the housing. The link 37 is deflected as indicated at 46 (Fig. 3), so that when the beater assembly 21 is in its lowered position, the pin 39 connecting the crank arm 41 to the link 37 is drawn under the shaft beyond a dead center position with relation to the upper pivot pin 38, with the result that the beater assembly 21 will be retained in its lowered position until the handle 44 is manually returned to its upper position. The shaft 42 extends through a plate 47 (Figs. 2 and 5) which is affixed to one of the frame plates 14 and is provided with a pair of opposed, inwardly extending lugs 48 arranged to be engaged by lugs 49 rigid with the shaft 42 to limit rotation of the shaft 42 in either direction.

A diluent accumulator 50, supported by a suitable bracket 51 from the frame plates 14, is designed to measure and store a quantity of water sufficient to dilute a standardized charge of concentrated juice to the desired consistency to yield a single serving of reconstituted beverage. It comprises a housing 52 including upper and lower cup-shaped members 53 and 54 (Figs. 6 and 7) secured together at their edges by bolts 55 to define a measuring chamber 56 therebetween. A diaphragm 57 of flexible sheet rubber extends across the chamber 56, the peripheral edge of the diaphragm being clamped between the edges of the cups 53 and 54 thus supporting the diaphragm and sealing the joint between the two cups. The diaphragm 57 is provided with a central opening 61, the edge of which is clamped between a nut 62 and a metering pin 64, both the nut 62 and the metering pin 64 being threaded on the lower end of a rod 66 which extends through the central opening 61 of the diaphragm 57.

The metering pin 64 comprises a shank 67 and an enlarged head 68 drilled and tapped to be threaded on the lower end of the rod 66. The lower cup 54 of the accumulator housing 52 is provided with a port 71 located to receive the shank 67 of the metering pin 64 when the diaphragm 57 is in its lower position, but the shank 67 is of such length that it enters the port 71 only when the diaphragm 57 has moved substantially one-half the distance from its upper to its lower position. The shank 67 is of slightly less cross sectional area than the port 71, hence water can flow through the port 71 but at a restricted rate when the shank 67 is within the port 71; but when the shank 67 is withdrawn from the port, flow through the port is at the full capacity of the port 71.

The upper cup 53 of the accumulator housing 52 is provided with an axial tubular extension 76, the bore 77 of which is large enough to accommodate a compression spring 78 encircling the rod 66 and under compression between the nut 62 and the shoulder 79 defining the upper end of the bore 77. The spring 78 urges the diaphragm 57 toward its lower position but is designed to yield when water under standard service pressure is supplied to the chamber 56 through the port 71. However, when pressure under the diaphragm 57 is relieved, the spring 78 returns the diaphragm 57 to its lowermost position, expelling the liquid previously supplied to and stored within the chamber 56.

The parts are so proportioned that the volumetric capacity of the chamber 56 corresponds to the amount of diluent required to reconstitute the standardized charge of concentrated beverage which the receptacle 32 is designed to receive.

Diluent liquid is supplied to the apparatus through a conduit 86 which leads to a normally closed inlet valve 89 (Figs. 4 and 5). Another conduit 91 leads from the valve 89 through a T-fitting 92 to a coupling 93 threaded into the outer end of the port 71 of the accumulator 50. Also communicating with the T-fitting 92 is another conduit 94 leading to a normally closed discharge valve 96; and from this valve 96, a delivery tube 97 extends through an opening 98 in the bottom wall 26 of the housing overhang 27, where it is directed downward toward the open top of the receptacle 32.

The valves 89 and 96 are disposed in opposed relation on opposite sides of the shaft 42 in position for the spring pressed operating plungers 101 and 102 of the valves 89 and 96, respectively, to be engaged by a cam 103 rigid with the shaft 42. The valve 89 controls flow to the accumulator from the supply conduit 86, and the cam 103 is so arranged upon the shaft 42 that it depresses the plunger 101 of the inlet valve 89 and thereby holds the valve open when the handle 44 is in its upright position (Fig. 5). When the handle 44 is rotated forward and down, the cam 103 turns clockwise as viewed in Figs. 4 and 5 and leaves the plunger 101, whereupon a spring 104 within the valve 89 moves the plunger 101 to its closed position. As the handle 44 approaches its lowermost position, the cam 103 engages the plunger 102 and, against the action of a spring 106, moves the plunger 102 to its open position and permits the accumulator spring 78 to eject the liquid stored within the chamber 56 through the valve 96. Consequently, the measured quantity of water is delivered automatically to the receptacle 32 as the result of the described movement of the handle 44.

The electric connections (Figs. 2, 3 and 5) include a safety switch 111, the movable contact 112 of which is urged by a spring 113 to a position of separation from a fixed contact 114. The contact 114 is connected by a conductor 116 to one terminal 117 of an electric attachment plug 118, and the movable contact 112 is connected by a conductor 119 to one terminal 120 of the motor 22. The other terminal 121 of the motor 22 is connected by a conductor 122 to the fixed contact 123 of a switch 124, the movable contact 126 of which is connected by a conductor 127 to the fixed contact 128 of the main control switch 129. The movable contact 131 of the switch 129 is connected by conductors 132 and 133 to the other terminal 134 of the attachment plug 118. Both of the switches 124 and 129 are normally open, their movable contacts 126 and 131 being yieldably separated from their fixed contacts 123 and 128 by springs 138 and 139, respectively.

The switch 129 constitutes the main control for the motor circuit and is mounted in position for its actuator 146 to be engaged by a cam 147 so positioned upon the shaft 42 that it engages the actuator 146 and closes the switch 129 just before the handle 44 reaches its extreme depressed position and holds the switch 129 closed as long as the handle 44 remains down.

The switch 124 is mounted on a bracket 151 carried by the tubular extension 76 of the accumulator 50, and is so arranged that its actuator 152 lies in the path of a barrel-shaped cam 153 carried by the upper end of the accumulator rod 66 but in such position thereupon that engagement between the cam 153 and the actuator 152 does not occur until the rod 66 has progressed a substantial distance toward its lowest position. Consequently, the switch 124 will not be closed until a substantial portion of the water stored within the accumulator 50 has been discharged into the mixing receptacle 32. Moreover the cam 153 is somewhat extended in length so that engagement between the cam 153 and the actuator 152 is maintained until the rod 66 reaches a position closely adjacent that which it occupies when the accumulator 50 is emptied.

It is important to observe that the two switches 124 and 129 are connected in series with each other so that completion of the main motor circuit, of which they are a part, is dependent upon closing of both switches 124 and 129 in addition to closing of the safety switch 111. The switch 111 is mounted upon a bracket 160 (Fig. 1) carried by one of the frame plates 14, with its actuator 161 extending through an aperture in the front wall 162 of the housing 28 below the overhang 27, to be engaged and moved to switch-closing position by the edge of the mixing receptacle 32 when the receptacle is seated upon the housing 28. Thus, the apparatus of the invention is incapable of operation until the receptacle 32 is seated upon the housing, but when the receptacle is seated on the housing, the motor circuit is conditioned for energization of the motor 22 upon subsequent closing of both switches 124 and 129.

An auxiliary motor actuating switch 166 is mounted upon the frame 11 in position for its actuator 167 also to be engaged by the cam 147. Such engagement, however, prevails only during either downward or upward movement of the handle 44 and does not occur while the handle occupies either its neutral position or its lowered position. The movable contact 168 of the auxiliary switch 166 is urged by a spring 169 to open position and is connected by a conductor 170 to the conductor 133 which communicates with the terminal 134 of the attachment plug 118. The fixed contact 171 of the switch 166 is connected by a conductor 172 to the terminal 121 of the motor 22. Hence, the auxiliary switch 166 exercises control over a secondary circuit whereby the motor 22 may be energized provided the safety switch 111 is closed, since the other terminal 120 of the motor 22 is connected to the terminal 117 of the attachment plug 118 through the safety switch.

The front 162 of the housing 28 is provided with a spring clip 181 (Figs. 3 and 4) under which the rim of the mixing receptacle 32 is adapted to be seated. Also carried by the front 162 of the housing 28 is a cleat 182 having a recess 183 within which a bottom flange 184 of the receptacle 32 is adapted to seat. The cleat 182 and clip 181 serve not only to support the receptacle 32 in suitable position upon the housing 28 for the blades 29 and 31 of the beater to operate therein, but they also cooperate to locate the receptacle 32 so accurately upon the housing 28 that when the receptacle 32 is in such position, the actuator 161 of the safety switch will be moved, closing the safety switch 111. The clip 181 also shields the actuator 161 to avoid its being moved otherwise than by the receptacle 32.

The safety switch 111 controls not only the primary motor circuit within which the switches 124 and 129 are included, but also the supplementary circuit including the switch 166. Therefore, neither of the motor circuits can be completed until the mixing receptacle 32 is in its operating position wherein it encloses the blades 29 and 31 of the beater regardless of whether the beater is in its raised or its lowered position. Accordingly, the receptacle 32 provides an effective shield avoiding possibility of injury to an operator by the beaters at any time when the apparatus is capable of having its motor 22 energized.

A support is provided upon which the mixing receptacle 32 can stand while the mixing machine is idle. This support comprises a tray 191 (Figs. 3 and 4) having a removable perforated screen 192 and seating on a portion 194 of the bottom plate 12 of the frame 11 which extends forward beyond the lower edge of the front wall 162 of the housing 28, below the blades 29 and 31 of the beater.

Operation

To prepare the apparatus for use, the inlet conduit 86 should be connected to a suitable source of drinking water at normal household pressure and the attachment plug 118 should be plugged in to a suitable source of electric energy. When the apparatus is idle the handle 44 is substantially upright as illustrated in Figs. 1, 2 and 5. The valve 96 controlling flow to the mixing receptacle 32 is closed, but the cam 103 holds inlet valve 89 open, thereby assuring that the quantity of water required to prepare a single serving of beverage is stored within the accumulator 50. The diaphragm 57 and rod 66 will, therefore, be in their uppermost position (Fig. 6), holding the cam 153 elevated above the actuator 152 of the switch 124. The beater assembly 21 also is elevated, as illustrated in the drawings. This is the normal, idle condition of the apparatus.

When it is desired to prepare a serving of citrus juice, an operator places a charge of frozen concentrated juice within the receptacle 32 and then, moving the receptacle upward to enclose the blades 29 and 31 of the beater therein, places the receptacle 32 with its upper edge behind the clip 181 and its lower edge resting upon the cleat 182 with the flange 184 seating within the recess 183 to hold the mixing receptacle 32 firmly in position. The charge of concentrate lies in the bottom of the receptacle 32 below the blades 29 since the beater is in its uppermost position.

The operator should then grasp the handle 44 and rotate it forward and down. This will rotate the crank 41 counterclockwise as viewed in Fig. 3, drawing the beater assembly 21 down until the blades 29 reach a position just above the bottom of the mixing receptacle 32 where the downward movement will be arrested by engagement of the lugs 49 on the shaft with the lugs 48 on the stationary plate 47. During their downward motion, the blades 29 cut the cake of frozen concentrate into smaller pieces as an initial step in breaking up the frozen mass. As a further aid in breaking up the cake of frozen concentrate, the beater is operated for a brief time interval as it is descending. Such momentary activation of the beater 21 is the result of engagement of the cam 147 with the actuator 167 of the auxiliary switch 166, while the handle 44 is being turned down, and assists in breaking up the frozen concentrate to particles of smaller size.

During the initial phase of the downward movement of the handle 44, the cam 103 becomes disengaged from the plunger 101 of the valve 89, permitting the spring 104 to move the plunger 101 to its closed position and thereby disconnecting the accumulator 50 from the water source. As the handle 44 approaches its lowermost position, the cam 103 engages the plunger 102 of the valve 96 and, against the action of the spring 106, moves the plunger 102 to its open position thereby initiating flow of stored water from the accumulator 50 through the upper portion of the tube 91, T-fitting 92, tube 94, valve 96, and tube 97 to the receptacle 32. Such flow is induced by the spring 78 which presses the diaphragm 57 downward toward the port 71 to expel the water stored within the accumulator. Throughout the first portion of the downward motion of the diaphragm 57, the shank 67 of the metering pin 64 is spaced above the port 71, permitting the water to flow from the chamber 56 at the full capacity of the port 71. But when the diaphragm 57 and rod 66 have descended through approximately one half of their stroke, the shank 67 of the metering pin 64 enters the port 71, thereby restricting the port 71 and greatly reducing the rate of flow through the port 71 and prolonging the time required for the remaining contents of the chamber to be expelled. Since the accumulator 50 is permitted to discharge initially at the full capacity of the port 71, a substantial quantity of diluent is supplied rapidly to the receptacle 32 to thus assure that a sufficient quantity of liquid is present to promote melting and dissolving of the concentrate when the beater 21 subsequently is activated by completion of the main motor circuit.

The cam 153 is mounted upon the rod 66 in such position that the cam engages the actuator 152 of the switch 124 when approximately one-third of the contents of the accumulator have been discharged, and the cam 147 and the main motor switch 129 are so related to each other that the switch 129 is closed as the handle reaches its lowermost position. The cam 147 holds the switch 129 closed throughout the time that the handle 44 is down and the cam 153 is of such length that it holds the switch 124 closed throughout almost the entire period that water flows from the accumulator through the port 71 after having been restricted by the metering pin 67. Therefore, when lowering the handle is completed, the motor 22 is activated, mixing the concentrate in the cup 32 with the water as it is supplied to the receptacle at the relatively slow rate determined by the relative size of the metering pin 67 and orifice 71.

The cam 153 passes out of engagement with the actuator 152 just prior to the arrival of the rod 66 at the lower end of its stroke and, consequently, when only a negligible quantity of water remains yet to be delivered to the receptacle. Upon release of the actuator 152 from the cam 153, the switch 124 opens, thereby de-energizing the motor 22 and causing the beater to cease operating. This serves as a signal to the attendant that the mixing operation is complete and the beverage is ready to be served. The attendant should then raise the handle 44 to its neutral position, causing the cam 103 to move out of the position in which it holds the discharge valve 96 open, and into the position in which it holds the inlet valve 89 open thereby permitting water to flow from the inlet tube 86 to the chamber 56 to refill the chamber and thereby place the apparatus in readiness for the next cycle of operation.

The upward motion of the rod 66 which results from refilling the chamber 56, and the consequent re-engagement of the cam 153 with the actuator 152 of the valve 124 does not effect energization of the motor because the cam 147 is withdrawn from engagement with the actuator 146 of the main control switch 129 as the return motion of the handle is begun. But as the handle 44 and shaft 42 return toward their neutral position, the cam 147 engages the actuator 167 of the auxiliary switch 166, causing the motor 22 again to be energized and thus activating the beater momentarily. This causes any drops or particles of the beverage that may be adhering to the beater to be thrown off and thereby prevents drip from the beater after the receptacle 32 has been removed.

The operator may then remove the receptacle 32 and pour the prepared beverage into a serving glass. When the receptacle 32 is removed, the actuator 161 of the safety switch 111 is released, permitting the spring 113 to open the switch 111. This assures that the beater will remain motionless until it again is enclosed within the mixing receptacle 32, regardless of the position of the handle 44.

After the completed beverage has been poured from the mixing receptacle 32, the receptacle 32 should be placed upon the screen 192 of the tray 191 where it is in a convenient location to receive the next successive charge of concentrate.

While we have shown and described a preferred embodiment of our invention, such invention is capable of modification and variation without departing from the spirit and scope thereof as defined in the claims appended hereto.

Having thus described our invention, what we claim and desire to protect by Letters Patent is:

1. Apparatus for reconstituting concentrated material comprising a beater, a motor operably connected to the beater, a receptacle adapted to receive concentrate and diluent, means for supporting the receptacle in position wherein the beater operates within the receptacle, diluent storing and dispensing means arranged to deliver diluent to said receptacle, means for directing diluent under pressure into said diluent storing and dispensing means, a movable member in said dispensing means arranged to be moved to a first position by the diluent whereby said dispensing means is filled with diluent, resilient means for moving said movable means to a second position wherein all of said diluent is displaced from said storing and dispensing means, and control means actuated by said movable member for energizing the motor after said resilient means moves said movable member to a position whereby a portion of the diluent is removed from said diluent storing and dispensing means, said control means being released by said movable member for deenergizing said motor upon delivery of substantially all of the diluent from said dispensing means.

2. Apparatus for reconstituting concentrated material comprising a beater, a motor operably connected to the beater, a receptacle arranged in position for the beater to operate therein, diluent storing and dispensing means arranged to deliver diluent to said receptacle, a movable member in said dispensing means arranged to be moved to one position by the inflow of diluent when said dispensing means is filled with diluent, means for directing fluid under pressure into said diluent storing and dispensing and means, resilient means for moving said movable means to a second position wherein all of said diluent is displaced from said storing and dispensing means, means connected to said movable member and operable for decreasing the normal rate of flow of diluent from said storing and dispensing means only after a predetermined portion of the diluent has been discharged from said storing and dispensing means, an electric control circuit for energizing the motor, a normally open switch connected in said circuit and positioned adjacent the movable member, and cam means on said movable member for closing the switch to energize said motor after a portion of the material has been discharged from the diluent storing and dispensing means, said cam means being arranged to open said switch when said movable member is positioned in said second position thereby deenergizing said motor upon delivery of said quantity of diluent to said receptacle.

3. Concentrated beverage reconstituting apparatus comprising a beater mounted for movement from an elevated, inoperative position to a lowered operative position, means for moving said beater, a mixing receptacle adapted to receive a charge of concentrate, means for arranging the receptacle in position to receive the beater, a motor operably coupled to the beater, a metering chamber for measuring and storing a predetermined quantity of diluent, a flexible resilient member in said chamber arranged to be moved from a position wherein the chamber is full to a position wherein the chamber is empty, a conduit for delivering diluent from said chamber to the receptacle, a valve in said conduit, means connected to said moving means and operable thereby to temporarily energize the motor and thereafter de-energize the motor and to open said valve as the beater is moved to said operating position, and means actuated by the movement of said flexible resilient member to again energize said motor after completion of said temporary energization and deenergization of said motor and after a predetermined quantity of the diluent has been delivered to the receptacle.

4. Concentrated beverage reconstituting apparatus comprising a beater mounted for movement optionally to an elevated, inoperative position and to a lowered, operative position, means operable to optionally raise and lower the beater, a mixing receptacle adapted to receive a charge of concentrate, means for arranging the receptacle in position to receive the beater, a motor operably coupled to the beater, a metering chamber for measuring a predetermined quantity of diluent, a conduit for delivering diluent from said chamber to the receptacle, a valve in said conduit, means connected to said moving means and operable thereby to energize the motor and to open said valve as the beater is moved to said operating position and to close the valve as the beater is returned to said inoperative position, and timing means for de-energizing the motor at the expiration of a predetermined time period after said valve is opened.

5. In a beverage mixing device, a frame, a beater movable on said frame from a lower operative position to an upper inoperative position, a motor carried by the frame and operatively connected to the beater, a mixing receptacle for the constituents of a beverage to be mixed, means for locating the receptacle with respect to the frame in position for the beater to operate therein, an electric circuit operably associated with the motor and including a switch for starting and stopping the motor, means for raising the beater from said lower to said upper position thereof, and means operably connected to said raising means for momentarily closing said switch as the beater approaches said upper position.

6. In a beverage mixing device, a frame, a beater movable on said frame from a lower operative position to an upper inoperative position, a motor carried by the frame and operatively connected to the beater, a mixing receptacle for the constituents of a beverage to be mixed, means for locating the receptacle with respect to the frame in position for the beater to operate therein, means for raising the beater to said upper position thereof, and means operated by said raising means as the beater approaches said upper position for temporarily energizing the motor to actuate the beater for a brief time interval and thereby effect removal of material clinging to the beater.

7. A concentrate diluting and mixing machine comprising an electric motor, a beater operably connected to the motor and mounted for movement optionally to an upper idle position and to a lower operative position, means operable to move the heater to a selected one of said positions, a mixing receptacle adapted to contain a charge of concentrate and located in position for the beater to operate in the receptacle when the beater is in its lower position, a diluent accumulator including means defining a measuring chamber, a flexible resilient diaphragm in said chamber for discharging contents of the chamber, resilient means for actuating said diaphragm when discharging the diluent, a supply valve and a discharge valve communicating with said measuring chamber, valve actuating means operative as the beater is lowered for closing said supply valve and subsequently for opening said discharge valve, a conduit leading from said discharge valve to a position where the conduit discharges into the receptacle, means for supplying diluent under pressure to said supply valve, and control means connected to said moving means and operable thereby to temporarily energize the motor and thereafter de-energize the motor prior to moving said beater to its lower operative position.

8. A concentrate diluting and mixing machine comprising an electric motor, a beater operably connected to the motor and mounted for movement optionally to an upper idle position or to a lower operative position, a mixing receptacle adapted to contain a charge of concentrate and located in position for the beater to operate in the receptacle when the beater is in its lower position, a diluent accumulator including means defining a measuring chamber, means for discharging contents of the chamber, and yieldable means for actuating the discharging means, a supply valve and a discharge valve communicating with said measuring chamber, valve actuating means operative as the beater is lowered for closing said supply valve and subsequently for opening said discharge valve and for closing said discharge valve and subsequently opening said supply valve as the beater is raised, a conduit leading from said discharge valve to a position where the conduit discharges into the receptacle, means for supplying diluent under pressure to said supply valve, means operative when the beater arrives at said operative position for energizing the motor, and means operatively related to the accumulator to de-energize the motor when the contents of the accumulator have been discharged.

9. A concentrate diluting and mixing machine comprising a frame, an electric motor mounted thereon, a beater operably connected to the motor and mounted on the frame for movement optionally to an upper idle position or to a lower operative position, a mixing receptacle adapted to contain a charge of concentrate and located in position for the beater to operate in the receptacle when the beater is in its lower position, a diluent accumulator including means defining a measuring chamber, means for discharging contents of the chamber, and yieldable means for actuating the discharging means, a supply valve and a discharge valve communicating with said measuring chamber, valve actuating means operative as the beater is lowered for closing said supply valve and subsequently for opening said discharge valve and for closing said discharge valve and subsequently opening said supply valve as the beater is raised, a conduit leading from said discharge valve to discharge into the receptacle, means for supplying diluent under pressure to said supply valve, means operative when the beater arrives at said operative position for energizing the motor, means operatively related to the accumulator to de-energize the motor when the contents of the accumulator have been discharged, and means controlling rate of discharge of the contents of said accumulator to determine the duration of the period of operation of the motor.

10. A concentrate diluting and mixing machine, comprising a frame, an electric motor mounted thereon, a beater operably connected to the motor and mounted on the frame for movement optionally to an upper idle position or to a lower operative position, means operable to move the beater to a selected one of said positions, a mixing receptacle adapted to contain a charge of concentrate and located in position for the beater to operate in the receptacle when the beater is in its lower position, a diluent accumulator including means defining a measuring chamber, means for discharging contents of the chamber, and yieldable means for actuating the discharging means, a supply valve and a discharge valve communicating with said measuring chamber, valve actuating means operative as the beater is lowered for closing said supply valve and subsequently for opening said discharge valve and for closing said discharge valve and subsequently opening said supply valve as the beater is raised, a conduit leading from said discharge valve to a position where the conduit discharges into the receptacle, means for supplying diluent under pressure to said supply valve, means operative when the beater arrives at said operative position for energizing the motor, means operatively related to the accumulator to de-energize the motor when the contents of the accumulator have been discharged, and means operative when an initial part of the contents of the accumulator have been discharged for restricting flow of the balance of said contents to prolong the period of operation of the motor.

11. A concentrate diluting and mixing machine comprising a frame, an electric motor mounted thereon, a beater operably connected to the motor and mounted on the frame for movement optionally to an upper idle position or to a lower operative position, a mixing receptacle adapted to contain a charge of concentrate and located in position for the beater to operate in the receptacle when the beater is in its lower position, a diluent accumulator including means defining a measuring chamber, means for discharging contents of the chamber, and yieldable means for actuating the discharging means, a supply valve and a discharge valve communicating with said measuring chamber, valve actuating means operative as the beater is lowered for closing said supply valve and subsequently for opening said discharge valve and for closing said discharge valve and subsequently opening said supply valve as the beater is raised, a conduit leading from said discharge valve to a position where the conduit discharges into the receptacle, means for supplying diluent under pressure to said supply valve, means operative when the beater arrives at said operative position for energizing the motor, means operatively related to the accumulator to de-energize the motor when the contents of the accumulator have been discharged, and means operative when an initial part of the contents of the accumulator have been discharged for restricting flow of the balance of said contents to prolong the period of operation of the motor, said restricting means being inoperative during discharge of said initial part of said contents whereby a substantial quantity of diluent is discharged rapidly into the receptacle before the rate of discharge from the accumulator is retarded.

12. A concentrate diluting and mixing machine comprising a frame, an electric motor mounted thereon, a beater operably connected to the motor and mounted on the frame for movement optionally to an upper idle position or to a lower operative position, means operable to move the beater to a selected one of said positions, a mixing receptacle adapted to contain a charge of concentrate and located in position for the beater to operate in the receptacle when the beater is in its lower position, a diluent accumulator including means defining a measuring chamber, means for discharging contents of the chamber, and yieldable means for actuating the discharging means, a supply valve and a discharge valve communicating with said measuring chamber, valve actuating means operative as the beater is lowered for closing said supply valve and subsequently for opening said discharge valve, said valve actuating means also being operative as the beater is raised for closing said discharge valve and subsequently opening said supply valve, a conduit leading from said discharge valve to discharge into receptacle, means for supplying diluent under pressure to said supply valve, means operative when the beater arrives at said operative position for energizing the motor, means operatively related to the accumulator to de-energize the motor when the contents of the accumulator have been discharged, and means operative as the beater approaches said upper position for again energizing the motor and subsequently de-energizing the motor to actuate the beater for a brief time interval and thereby effect removal of material clinging to the beater.

References Cited in the file of this patent

UNITED STATES PATENTS

| | | |
|---|---|---|
| 244,092 | Thayer | July 12, 1881 |
| 875,543 | Lynch | Dec. 31, 1907 |
| 1,067,845 | Shattuck | July 22, 1913 |
| 1,115,518 | Dwiggins | Nov. 3, 1914 |
| 1,387,908 | Riedel | Aug. 16, 1921 |
| 1,454,765 | Patterson et al. | May 8, 1923 |
| 1,521,038 | Moore | Dec. 30, 1924 |
| 1,846,135 | Mickelsen | Feb. 23, 1932 |
| 1,991,595 | Creveling | Feb. 19, 1935 |
| 2,026,240 | Luxmore | Dec. 31, 1935 |
| 2,081,650 | Tamminga et al. | May 25, 1937 |
| 2,112,059 | Arthur | Mar. 22, 1938 |
| 2,368,540 | Goodman | Jan. 30, 1945 |
| 2,463,697 | Kipper | Mar. 8, 1949 |
| 2,556,494 | Farquharson | June 12, 1951 |
| 2,559,032 | Tacchella | July 3, 1951 |
| 2,564,852 | Mason | Aug. 21, 1951 |
| 2,568,107 | Allen | Sept. 18, 1951 |
| 2,612,353 | Steiner et al. | Sept. 30, 1952 |
| 2,628,082 | Fredenhagen et al. | Feb. 10, 1953 |
| 2,782,012 | Coyne et al. | Feb. 19, 1957 |